(12) United States Patent
Burgeson

(10) Patent No.: US 6,830,128 B2
(45) Date of Patent: Dec. 14, 2004

(54) TEMPORARY LADDER TREE STAND ANCHOR

(76) Inventor: John R. Burgeson, 4345 157th Ave. Northwest, Anoka, MN (US) 55304

(*) Notice: Subject to any disclaimer, the term of this patent is extended or adjusted under 35 U.S.C. 154(b) by 0 days.

(21) Appl. No.: 10/285,784

(22) Filed: Nov. 1, 2002

(65) Prior Publication Data
US 2004/0084248 A1 May 6, 2004

(51) Int. Cl.$^7$ ................................................ E06B 3/48
(52) U.S. Cl. ...................................... 182/116; 182/187
(58) Field of Search ................................ 182/116, 115, 182/151, 152, 187, 188, 93; 11/11

(56) References Cited

U.S. PATENT DOCUMENTS

| | | | | |
|---|---|---|---|---|
| 4,113,057 A | * | 9/1978 | Bessinger | 182/187 |
| 4,493,395 A | * | 1/1985 | Rittenhouse | 182/187 |
| 5,344,157 A | * | 9/1994 | McCord | 473/492 |
| 5,368,127 A | * | 11/1994 | Phillips | 182/187 |
| 5,509,499 A | * | 4/1996 | Prejean | 182/93 |
| 5,823,895 A | * | 10/1998 | Rasic | 473/430 |
| 6,138,792 A | * | 10/2000 | Morris | 182/93 |
| 6,325,174 B1 | * | 12/2001 | Lamar | 182/187 |
| 6,353,946 B1 | * | 3/2002 | Steiner | 5/121 |
| 6,438,802 B1 | * | 8/2002 | Beeman et al. | 24/135 R |
| 6,588,546 B1 | * | 7/2003 | Forrest | 182/135 |
| 6,681,892 B2 | * | 1/2004 | Husband | 182/93 |
| 2002/0096396 A1 | * | 7/2002 | Harmston | 182/93 |
| 2002/0112919 A1 | * | 8/2002 | Graham, Jr. | 182/116 |
| 2003/0146048 A1 | * | 8/2003 | Garbs | 182/116 |
| 2003/0192741 A1 | * | 10/2003 | Berkbuegler | 182/187 |

* cited by examiner

Primary Examiner—Bruce A. Lev
(74) Attorney, Agent, or Firm—Gerald E. Helget; Nelson R. Capes; Briggs & Morgan, P.A.

(57) ABSTRACT

A temporary ladder tree stand anchor for ladder stand with a ladder portion and a platform with a frame, seat and foot support. The temporary anchor includes a cord with two ends and an intermediate section for wrapping about the tree. The cord anchor is on one side of the platform to secure one end of the cord thereto. A cord catch is on the other side of the platform for slidably capturing the intermediate cord section to permit drawing of the other cord end to pull and temporary anchor the ladder tree stand to the tree while the hunter is one the ground thereby permitting climbing up and down the tree stand safely when the tree stand is not securely anchored to the tree.

4 Claims, 3 Drawing Sheets

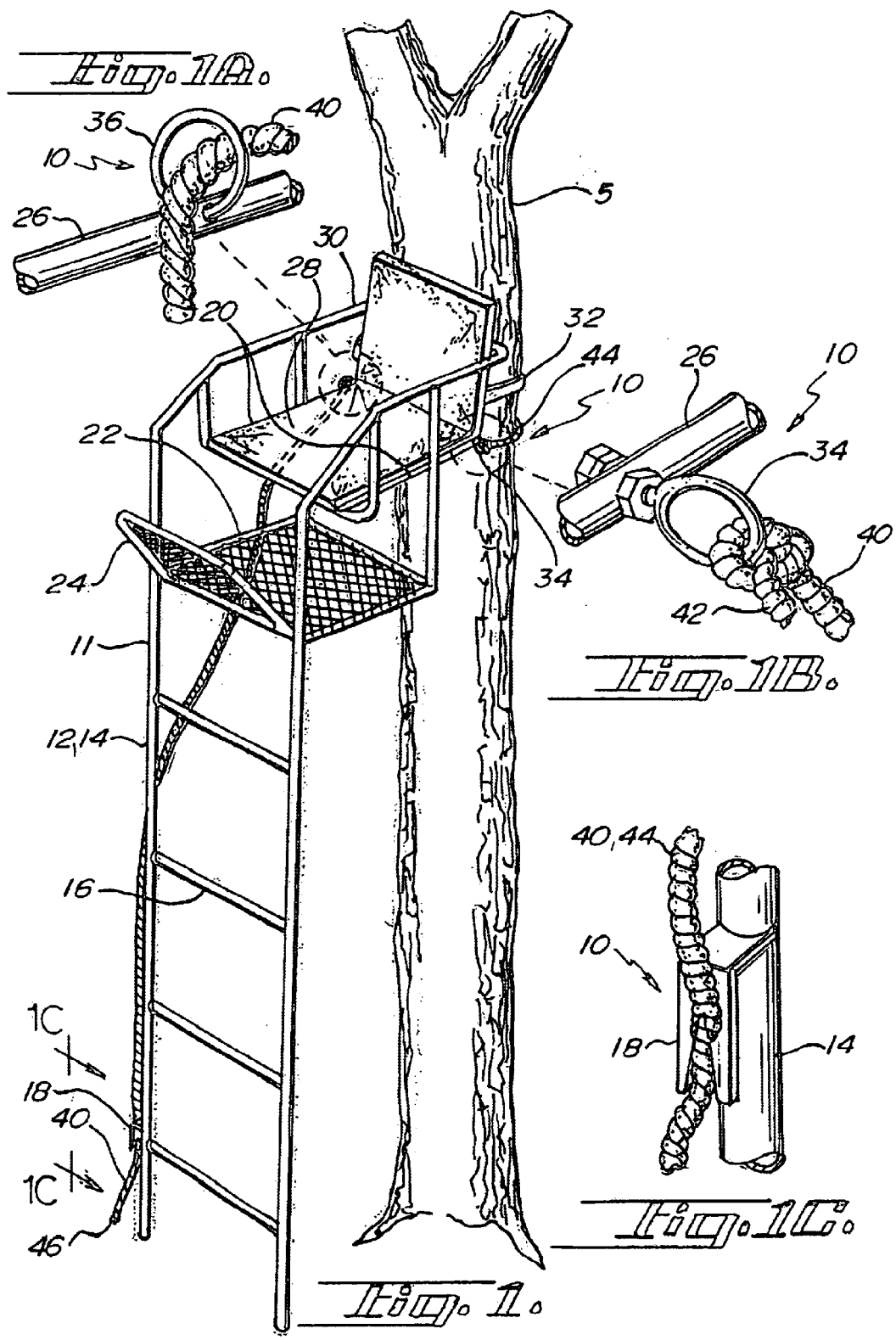

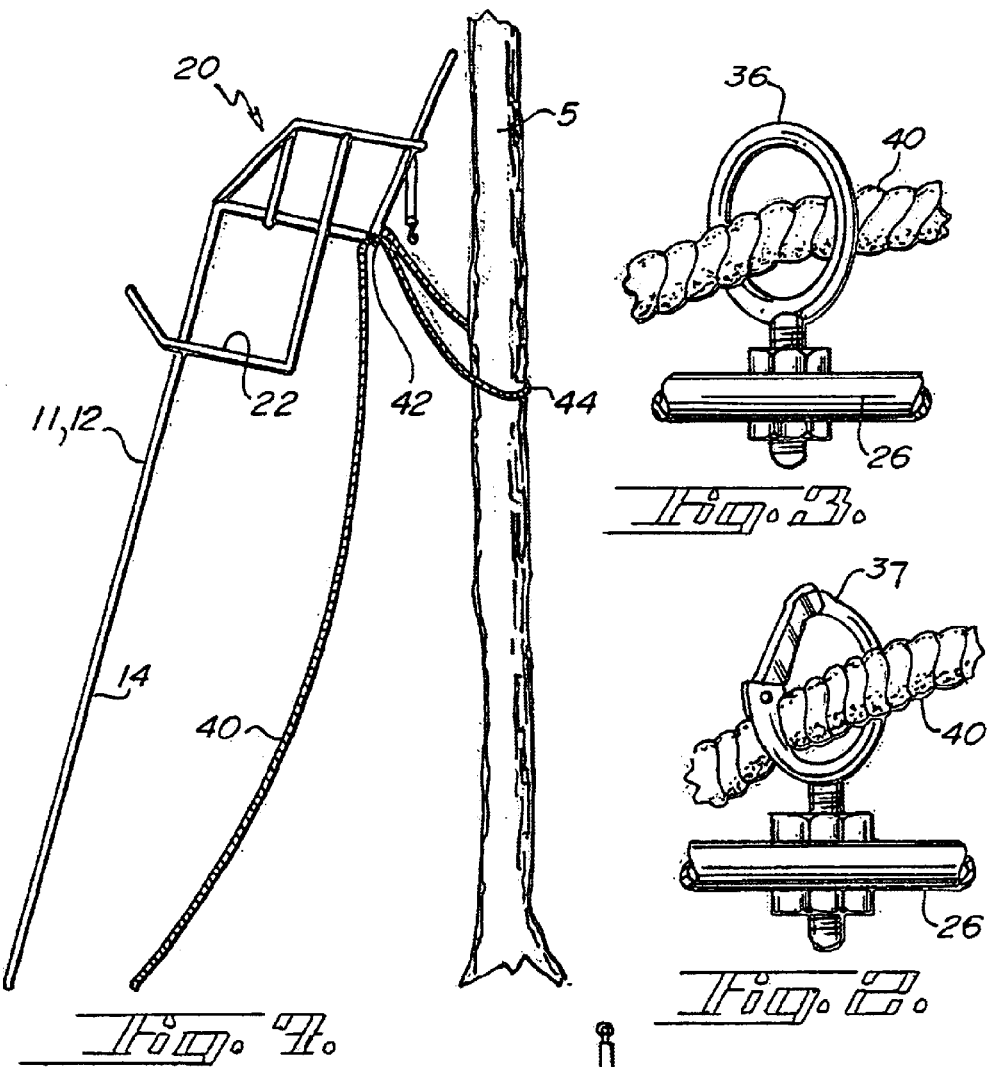
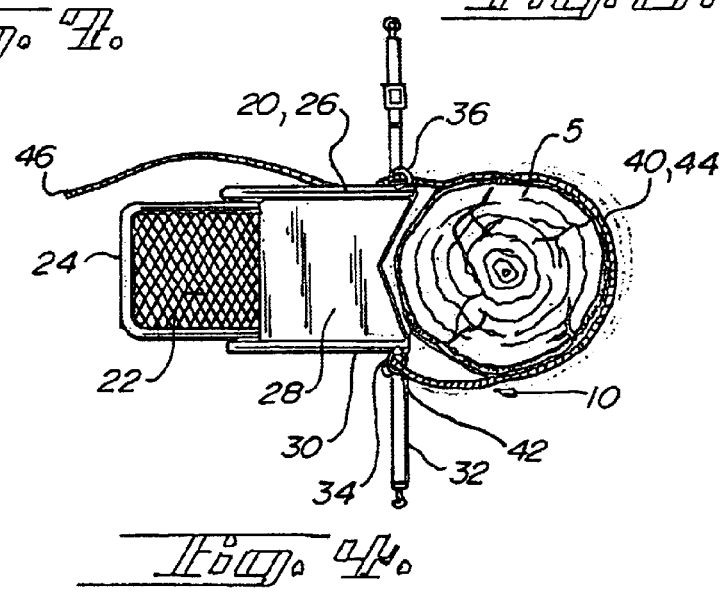

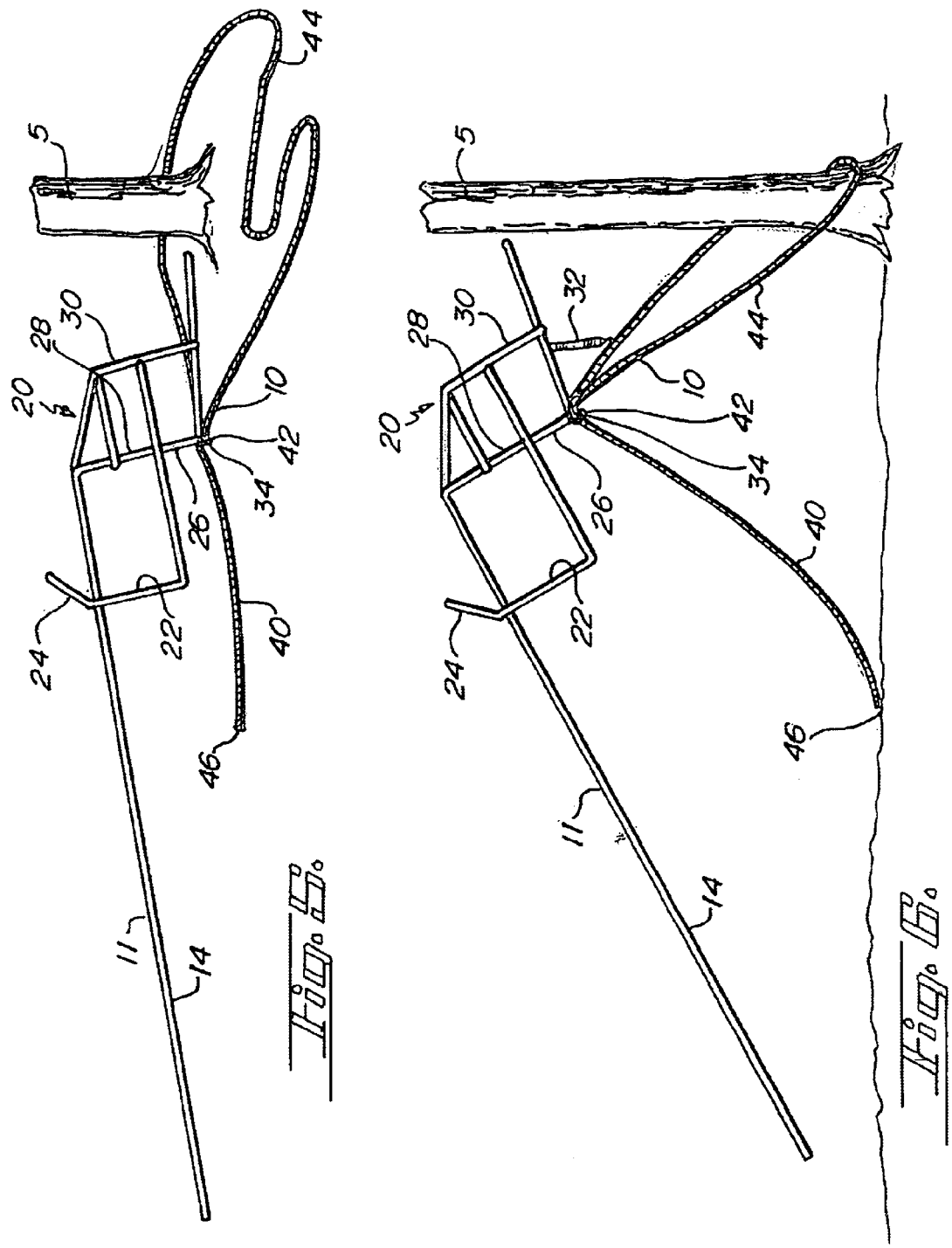

TEMPORARY LADDER TREE STAND ANCHOR

BACKGROUND OF THE INVENTION

This invention relates to ladder tree stands, and more particularly, to a temporary ladder tree stand anchor used to temporarily anchor the ladder tree stand to a tree for safely climbing up and down the tree stand when the stand is not securely anchored to the tree.

Big game animals are also constantly watching for danger with their eyes. The vast majority of the time, they are watching near ground level, therefore elevated hunting positions reduce the odds of a hunter being seen.

Hunting big game four-legged animals is often conducted from elevated stands in trees. Big game such as elk, moose, caribou, deer, antelope, bear and alike, have an acute sense of smell. Consequently, hunters have elevated their hunting positions into trees so that their scent is not easily picked up by the hunted animal on the ground.

There are many types of tree stands. There are single piece tree stands that chain to a tree. Also there are two piece climbing tree stands and there are also ladder stands. Ladder stands include a ladder portion and an upper platform with a frame, seat and foot support to comfortably position the hunter. Ladder stands are relativity safe, sturdy and easy to put up and take down in a few moments.

Ladder tree stands are dangerous when initially securing them to the tree and when unsecuring them from the tree. This is so because the hunter must be in the stand platform at the time. That is, with initial securement and removal, the hunter is in the platform when the ladder tree stand is not securely anchored to the tree. At this time and when climbing up and down the ladder, there is a dangerous potential of the tree stand falling backwards away from the tree and severely injuring the hunter from a fall of twelve feet or more above the ground.

When climbing up and down the ladder of a ladder stand, the weight of the hunter is positioned so that it tends to pull the top portion of the ladder and stand away from the tree. Even if the ladder is attached at a lower point, the ladder tubing or structural material can bend when the hunter's hands are positioned above that point and weight is pulling away from the tree.

Pulling away from the tree can result in the structural material failing and bending away from the tree or temporarily pulling back away from the tree and failing to nest back against the tree when it returns or the platform simply slips off the tree in a sideways manner. Any of these three events could result in serious injury to the hunter.

Although some ladder stands have a system to temporarily secure the platform to the tree during set-up, they suffer from a major lack of optimum physical positioning for strength and stability. The straps that are attached to the platform are intended to wrap around the tree several feet below the platform, which leaves the hunter with the potential for the top of the stand to pull away and perhaps not return or not return to the properly nested position or slip sideways out of the nested position.

There is a need for a temporary ladder tree stand anchor for a ladder tree stand that will temporally anchor the ladder tree stand to the tree for safety climbing up and down the tree stand when the tree stand is not securely anchored to the tree.

SUMMARY OF THE INVENTION

A temporary ladder tree stand anchor for ladder stand with a ladder portion and a platform with a frame, seat and foot support. The temporary anchor includes a cord with two ends and an intermediate section for wrapping about the tree. The cord anchor is on one side of the platform to secure one end of the cord thereto. A cord catch is on the other side of the platform for slidably capturing the intermediate cord section to permit drawing of the other cord end to pull and temporary anchor the ladder tree stand to the tree while the hunter is on the ground thereby permitting climbing up and down the tree stand safely when the tree stand is not securely anchored to the tree.

A principal object and advantage of the present invention is that the temporary ladder tree stand secures the ladder tree stand to the tree temporarily for safely climbing up and down when the tree stand is not securely anchored to the tree.

Another object and advantage of the present invention is that the temporary ladder tree stand anchor can secure the ladder stand to the tree from the ground by the hunter by simply pulling the rope and holding the rope taut or otherwise securing it to a cinch or ladder rung.

Another object and advantage of the present invention is that it secures the platform to the tree at the same height both on the platform and tree—optimum physical positioning. Securing in this manner minimizes the chances for the stand to pull away or slip off the tree. The temporary rope securing the platform to the tree is utilizing the shortest and by far the most effective routing of rope around the tree. It has the optimum rope positioning to prevent pull-away or sideways slip. This is a dramatic improvement over existing systems.

Another object and advantage to the present invention is that the temporary anchor is inexpensive and easy to manufacture and readily adapts to any existing and/or new ladder tree stand.

BRIEF DESCRIPTION OF THE DRAWINGS

FIG. 1 is a perspective view of the ladder tree stand with a temporary ladder tree stand anchor holding the ladder tree stand to the tree;

FIG. 1A is an enlarged broken away view of the phantom circled portion from FIG. 1;

FIG. 1B is a broken away enlarged portion of the phantom circled portion from FIG. 1;

FIG. 1C is a broken away enlarged view taken along lines 1C—1C of FIG. 1;

FIG. 2 is a modified embodiment of the cord catch;

FIG. 3 is a preferred cord catch;

FIG. 4 is a top plan view of the temporary ladder tree stand anchor securing the ladder tree stand temporary to the tree;

FIG. 5 is the first installation step of the ladder tree stand laying on the ground next ti a tree;

FIG. 6 is a partially installed view of the ladder tree stand being lifted onto the tree with the temporary tree stand anchor loosely looped about the tree; and FIG. 7 is a further installed view of the ladder tree stand against a tree with the ladder tree stand anchor being pulled into position with final position shown in FIGS. 1 and 4.

DETAILED DESCRIPTION

Referring to FIGS. 1 through 4, the temporary ladder tree stand anchor 10 attached to a ladder stand 11 secured to a tree 5 may be appreciated. Ladder stand 11 includes a ladder portion 12 with parallel vertical supports 14 and rungs 16 therebetween. On a lower portion of the vertical supports 12 may be located a cord cinch 18. The upper portion of ladder stand 11 supports a platform 20 with foot support 22, foot rest 24, seat frame 26 and seat 28. Hand rails 30 may be optionally adjacent seat portion 28. Typically a tree strap or chain 32 extends from the seat frame portion 26 for securely anchoring the ladder stand 11 to a tree 5.

A cord anchor 34 shown in FIG. 1A may comprise a ring, loop or eyelet to which a cord 40, particularly one end 42, may be readily secured such as by a knot. The cord anchor 34 is located on seat frame 26 suitably and typically adjacent to tree strap or chain 32. Cord ring 36 suitably may be a catch, collar, hook, loop or eyelet clearly shown in FIGS. 1A, 2 and 3. In FIG. 2 the cord ring 37 is openable and does not require threading of cord 40 therethrough. As can been seen from the figures, the cord 40 has one end 42, other cord end 46 and intermediate section 44 therebetween.

Referring to FIGS. 4 through 7 and FIG. 1, the operation of the present invention may be appreciated. Initially the ladder stand is assembled on the ground adjacent the tree 5 is shown is FIG. 5. The other end of cord 46 is looped around tree 5 and threaded through cord ring 36. Next the tree stand is elevated as shown in FIG. 6. Next the tree stand is further elevated and leaned up against a tree as shown in FIG. 7. The other end 46 of cord 40 is drawn as clearly shown in the figure. Next the ladder stand 11 is set upright with the platform 20 steadily against a tree as shown in 1 and 4. The other end of cord 46 is again drawn tight as the intermediate section 40 is drawn tightly from the cord anchor 34 around tree 5 and through cord ring 36, the cord 40 can simply be held taut by the hunter as he climbs up the ladder. Otherwise the cord can be tied to a step or rung cinched as shown in FIGS. 1 and 1C. The hunter then climbs the ladder stand and steps onto foot support 22 and thereafter secures tree strap or chain 32 to securely anchor a ladder stand 11 to the tree 5. After which, the temporary ladder tree stand anchor 10 may be removed or left limply in position.

The reverse operation is appropriate for removing the ladder stand 11 from the tree 5. That is, the temporary ladder tree stand anchor 10 is property secured and the tree strap or chain 32 is released from the tree. Next the hunter climbs down from the ladder stand 11 after which the cord 40 is released form the cord cinch 18 and the cord will then freely flow through the cord ring 36 as the tree stand is lowered to the ground.

A review of the appended claims will give a true scope of this invention while the figures and the specification are intended to be illustrative embodiments.

What is claimed is:

1. A ladder tree stand and a temporary ladder tree stand anchor for the ladder tree stand, comprising:

(a) a ladder portion connected to a platform with a frame, a seat and a foot support comprising the ladder tree stand to be supported by and securely anchored to a tree;
    (b) the temporary ladder tree stand anchor comprising:
        (i) a cord with two ends and an intermediate section for wrapping about the tree;
        (ii) a cord anchor adapted to be attached on one side of the platform to secure one end of the cord thereto;
        (iii) a cord catch for slidably capturing the intermediate cord section to permit drawing of the other cord end; and
        (iv) a cord cinch on a lower ladder portion adapted for attaching the cord adjacent the other cord end thereto for temporarily anchoring the ladder tree stand to the tree by a user on the ground.

2. The temporary ladder tree stand anchor of claim 1, wherein the cord anchor comprises a ring adapted to be fixed to the platform and the cord secured thereto.

3. The temporary ladder tree stand anchor of claim 1, wherein the cord catch is a ring larger than the cord for slidably passing the cord therethrough.

4. The temporary ladder tree stand anchor of claim 1, wherein the cord catch is an openable ring larger than the cord for slidably capturing the cord.

* * * * *